United States Patent
Lee et al.

(10) Patent No.: US 7,352,423 B2
(45) Date of Patent: Apr. 1, 2008

(54) LIQUID CRYSTAL DISPLAY USING COMPENSATING FILM AND MANUFACTURING METHOD THEREOF

(75) Inventors: Man Hoan Lee, Seoul (KR); Ku Hyun Park, Gyeonggi-do (KR); Un Nyoung Sa, Gyeonggi-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/878,123

(22) Filed: Jun. 29, 2004

(65) Prior Publication Data

US 2005/0128394 A1 Jun. 16, 2005

(30) Foreign Application Priority Data

Dec. 16, 2003 (KR) .................. 10-2003-0092012

(51) Int. Cl.
*G02F 1/1335* (2006.01)
(52) U.S. Cl. ........................................ 349/119
(58) Field of Classification Search ........... 349/119
See application file for complete search history.

(56) References Cited

U.S. PATENT DOCUMENTS

| | | | | |
|---|---|---|---|---|
| 5,179,457 A * | 1/1993 | Hirataka et al. | ............ | 349/119 |
| 5,196,953 A * | 3/1993 | Yeh et al. | .................. | 349/119 |
| 5,589,963 A * | 12/1996 | Gunning et al. | ............ | 349/119 |
| 5,929,955 A * | 7/1999 | Hsieh et al. | ................ | 349/106 |
| 6,078,373 A * | 6/2000 | Hsieh et al. | ................ | 349/106 |
| 6,160,599 A * | 12/2000 | Hsieh et al. | ................ | 349/117 |
| 6,169,590 B1 * | 1/2001 | Abileah et al. | ............ | 349/120 |
| 6,226,063 B1 * | 5/2001 | Hsieh et al. | ................ | 349/106 |

\* cited by examiner

*Primary Examiner*—James A. Dudek
(74) *Attorney, Agent, or Firm*—Birch, Stewart, Kolasch & Birch, LLP (57) ABSTRACT

A liquid crystal display using a compensating film includes a liquid crystal panel having upper and lower substrates, and a liquid crystal layer interposed between; a first compensating film formed over an inner surface of at least one of the upper substrate lower substrates; a second compensating film formed over an outer surface of at least one of the upper and lower substrates; and first and second polarizing plates attached over the second compensating film and on an outer surface of the other one of the upper lower substrates such that a first optical transmission axis of the first polarizing plate is perpendicular to a second optical transmission axis of the second polarizing plate. The compensating film is formed inside the liquid crystal panel, thereby preventing light leakage at a viewing angle and improving the viewing angle characteristics.

22 Claims, 7 Drawing Sheets

LIQUID CRYSTAL DISPLAY USING COMPENSATING FILM AND MANUFACTURING METHOD THEREOF

This application claims the benefit of Korean Application No. P2003-92012, filed on Dec. 16, 2003, which is hereby incorporated by reference.

BACKGROUND OF THE INVENTION

1. Field of the Invention

The invention relates to a liquid crystal display using a compensating film that prevents light leakage at a viewing angle and at the polarizing plate and improves the color characteristics at the viewing angle.

2. Description of the Related Art

Liquid crystal (LC) molecules have an anisotropy based upon their asymmetric shape. The optical anisotropy of an LC cell containing a film of such LC molecules changes depending on the distribution and tilt angle of liquid crystal molecules.

The above properties constitute important factors toward changing the polarization of light according to the viewing angle of a cell or a film of LC. Due to the inherent properties of the LC, variations in the brightness and the contrast ratio according to upper, lower, left and right viewing angles are caused during the operation of a liquid crystal display (LCD). These variations in brightness and contrast acts as one of the most disadvantageous properties of the LCD.

Figure 1:
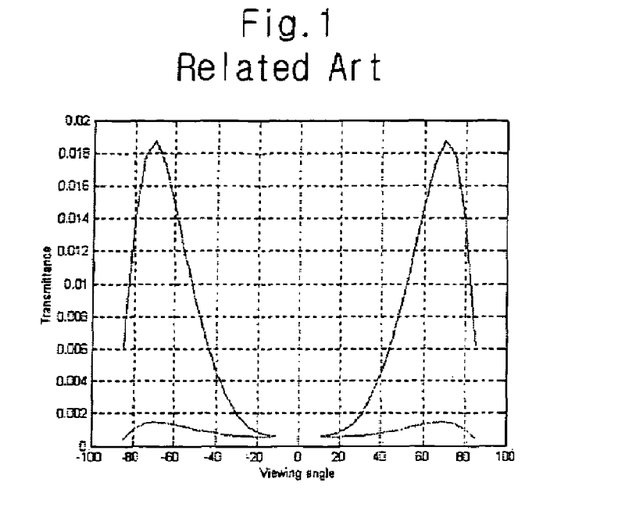
FIG. 1 shows a graph illustrating a viewing angle characteristic of an LCD according to the related art.

FIG. 1 shows a graph illustrating a viewing angle characteristic of an LCD according to the related art. As shown in FIG. 1, when a black is attained in a front side at a viewing angle of 0°, light leakage generates at a predetermined viewing angle, even from the polarizing plates that are perpendicular to each other. In particular, the light leakage maximizes at a viewing angle of 70°.

To addresses this problem, a method where a compensating film to compensate for the anisotropic distribution was devised.

Figure 2:
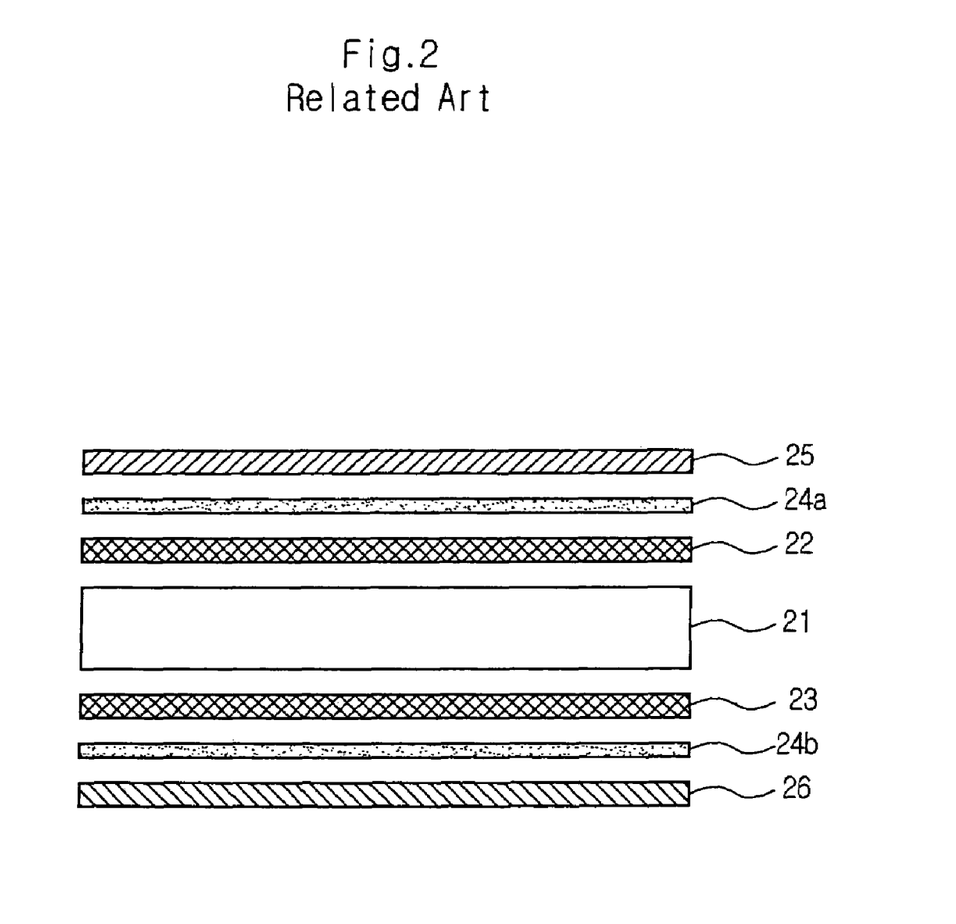
FIG. 2 shows a view schematically illustrating a structure of an LCD provided with a compensating film according to the related art.

FIG. 2 shows a schematic view illustrating a structure of an LCD provided with a compensating film according to the related art. Referring to FIG. 2, the related art LCD includes: a liquid crystal display (LCD) panel having an upper substrate 22, a lower substrate 23 spaced apart a predetermined distance from the upper substrate 22, and a liquid crystal layer 21 interposed between the upper substrate 22 and the lower substrate 23. Compensating films 24a and 24b are respectively attached on both outer surfaces of the LCD panel, and first and second polarizing plates 25 and 26 are attached on the compensating films such that an optical transmission axis of the first polarizing plate 25 is perpendicular to an optical transmission axis of the second polarizing plate 26.

The compensating films 24a and 24b have an anisotropic distribution opposite to that of the LC cell, if possible, and are made to remove a retardation difference of light according to the viewing angle when they are coupled with an LC cell.

In general, a compensating film made of polymer influences a variation in the phase difference with respect to the transmission light, and the compensating film extends in a predetermined direction to have birefringence due to an anisotropic orientation of molecules.

For example, when an external electric field is applied to a normal black mode twisted nematic (TN) LCD, liquid crystal molecules are aligned in response to the electric field, so that a light transmission is generated by the equations below:

$$I = I_0 \sin^2[\theta(1+u^2)^{1/2}],$$

$$u = \frac{\pi R}{\theta \lambda},$$

$$R = \Delta n \cdot d$$

where I is the intensity of a transmission light, $I_0$ is the intensity of an incident light, $\Delta n$ is the birefringence, d is the thickness of an LC cell, $\lambda$ is the wavelength of the transmitted light, $\theta$ is the twist angle of a twisted nematic LC, and R is the phase difference.

The above equations show that since the phase difference has a close relationship with the viewing angle, a compensation of the phase difference is desirable for an improvement of the viewing angle.

The compensating films disposed between the LCD panel and the polarizing plate, for the purpose of the compensation of the phase difference, uses a uniaxial birefringent anisotropic material and a biaxial birefringent anisotropic material.

Figure 3A:
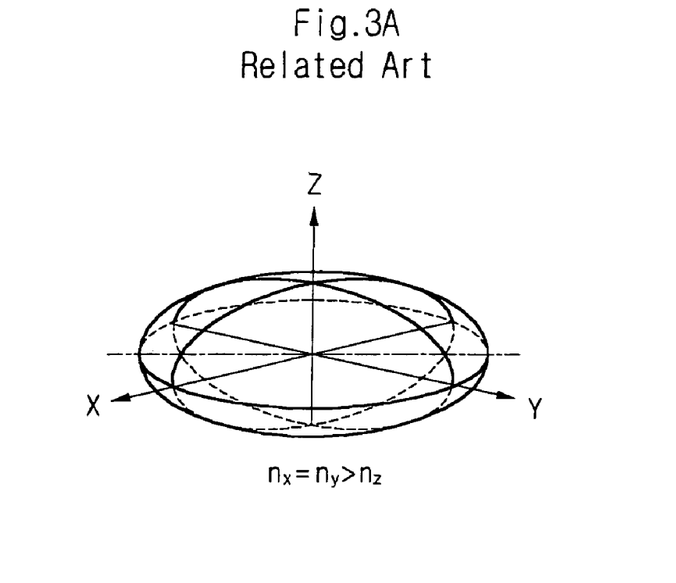
FIGS. 3A through 3C show refractive index ellipsoids of a phase difference compensating film.
Figure 3B:
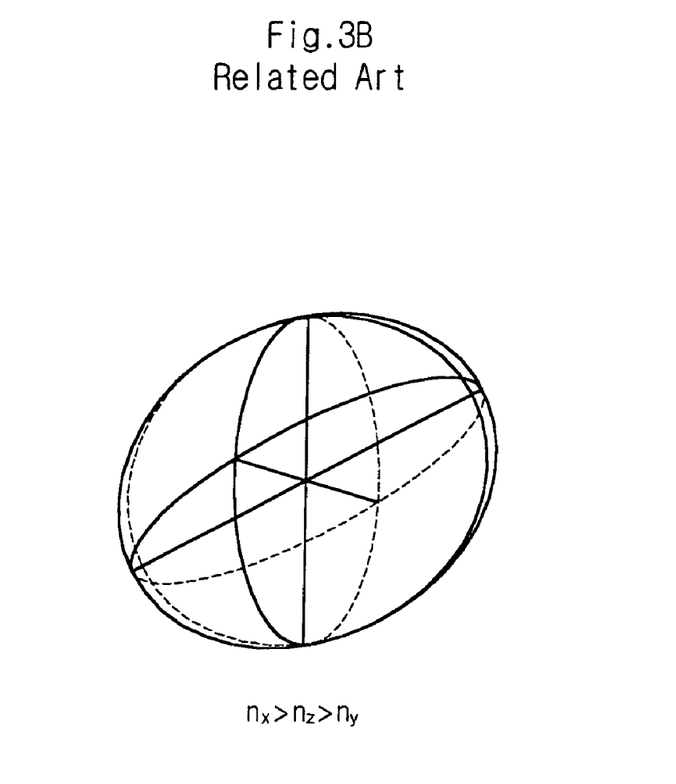
Figure 3C:
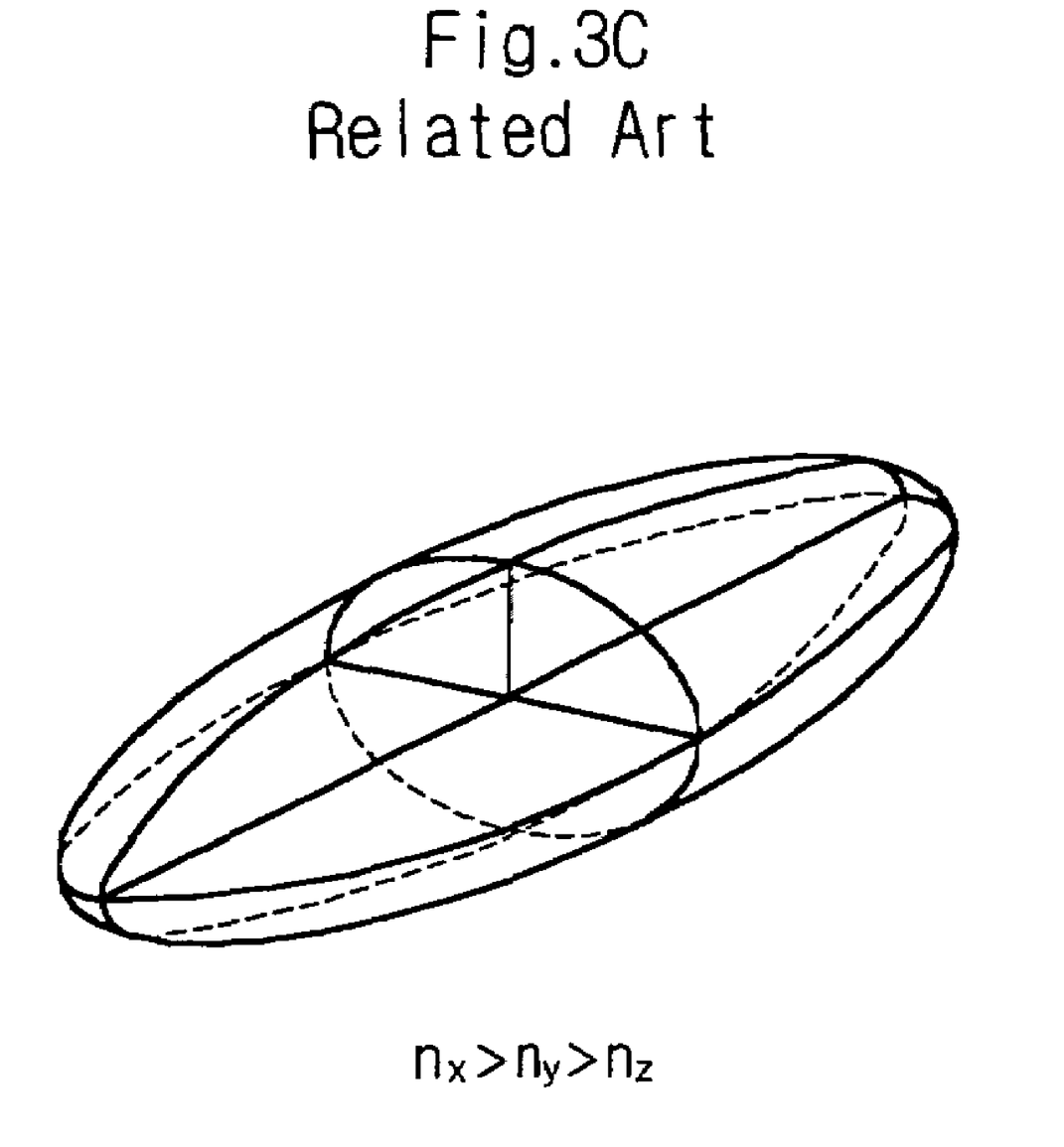

FIGS. 3A through 3C show a refractive anisotropic ellipsoid of a phase difference compensating film. As shown in FIGS. 3A through 3C, the refractive indexes in x, y, z-direction of a Cartesian coordinate are $n_x$, $n_y$ and $n_z$, the uniaxial property and the biaxial property are determined by whether or not $n_x$ is identical to $n_y$. In other words, as shown in FIG. 3A, if refractive indexes $n_x$ and $n_y$ of the x and y-directions are identical to each other and their size is different from the size of the refractive index $n_z$ of the remaining direction z, it is called 'uniaxial.' As shown in FIGS. 3B and 3C, when the refractive indexes $n_x$, $n_y$ and $n_z$ in the three directions are different from one another, it is called 'biaxial.'

The generally used compensating film using a uniaxial refractive index anisotropic material has the long axis of an ellipsoid, which is parallel to or is perpendicular to a surface of the film.

In the related art method of manufacturing a compensating film, a polymer film extends uniaxially or biaxially thereby obtaining the desired refractive index such that the optical axis of the phase difference film has an arbitrary angle with respect to the advancing direction of the film.

Phase difference films made as described above have optical axes that are parallel to or are perpendicular to the extending direction of the film. Hence, to use the phase difference films for the purpose of optical compensation in an LCD, the optical axes of the phase difference film must form an arbitrary angle with the optical axes of the polarizing plate. It is accordingly necessary to specially cut the manufactured phase difference films.

However, since the above method adjusts the extension ratio mechanically, it is difficult to control the orientation angle to achieve a desired angle. Also, the phase difference films are not attached from a roll, but one sheet at a time must be attached to the polarizing plate, and disadvantages in process efficiency and the management of foreign particles result.

SUMMARY OF THE INVENTION

Accordingly, the invention is directed to a liquid crystal display and manufacturing method thereof that substantially obviates one or more problems due to limitations and disadvantages of the related art.

An object of the invention is to provide a liquid crystal display using a compensating film formed inside the liquid crystal display to prevent light leakage, at a viewing angle, due to the liquid crystal and the polarizing plate, and to improve the color characteristics at the viewing angle, and a manufacturing method thereof.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

The invention, in part, provides a liquid crystal display that includes: a liquid crystal panel having an upper substrate, a lower substrate facing the upper substrate and spaced apart by a predetermined distance from the upper substrate, and a liquid crystal layer interposed between the upper and lower substrates; a first compensating film formed over an inner surface of at least one of the upper and lower substrates; a second compensating film formed over an outer surface of at least one of the upper and the lower substrates on which the first compensating film is formed; and first and second polarizing plates attached over the second compensating film and over an outer surface of the other one of the upper substrate and the lower substrate such that a first optical transmission axis of the first polarizing plate is perpendicular to a second optical transmission axis of the second polarizing plate.

The invention, in part, pertains to a liquid crystal panel having an upper substrate, a lower substrate facing the upper substrate and spaced apart by a predetermined distance from the upper substrate, and a liquid crystal layer interposed between the upper substrate and the lower substrate; first compensating films respectively formed over an inner surface of the upper substrate and an inner surface of the lower substrate; second compensating films respectively attached over an outer surface of the upper substrate and an outer surface of the lower substrate; and first and second polarizing plates attached over the second compensating films such that a first optical transmission axis of the first polarizing plate is perpendicular to a second optical transmission axis of the second polarizing plate.

The invention, in part, pertains to a liquid crystal panel having an upper substrate, a lower substrate facing the upper substrate and spaced apart by a predetermined distance from the upper substrate, and a liquid crystal layer interposed between the upper the lower substrates; first compensating films respectively formed over an inner surface of the upper substrate and an inner surface of the lower substrate; second compensating films respectively formed on the first compensating films; and first and second polarizing plates attached over outer surfaces of the liquid crystal panel such that a first optical transmission axis of the first polarizing plate is perpendicular to a second optical transmission axis of the second polarizing plate.

The invention, in part, provides a method of manufacturing a liquid crystal display provided with a liquid crystal panel having an upper substrate, a lower substrate facing the upper substrate and spaced apart by a predetermined distance from the upper substrate, and a liquid crystal layer interposed between the upper and the lower substrate, the method including forming a first compensating film on an inner surface of at least one of the upper substrate and the lower substrate; attaching a second compensating film over an outer surface of at least one of the upper substrate and the lower substrate over which the first compensating film is formed; and attaching first and second polarizing plates over the second compensating film and over an outer surface of the other one of the upper substrate and the lower substrate such that a first optical transmission axis of the first polarizing plate is perpendicular to a second optical transmission axis of the second polarizing plate.

According to the invention, the compensating film is formed inside the liquid crystal panel, thereby preventing light leakage at a viewing angle, due to the liquid crystal and the polarizing plates, and improving the viewing angle characteristic. The viewing angle can be 70°.

It is to be understood that both the foregoing general description and the following detailed description of the invention are exemplary and explanatory and are intended to provide further explanation of the invention as claimed.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention.

In the drawings.

DETAILED DESCRIPTION

Reference will now be made in detail to the preferred embodiments of the invention, examples of which are illustrated in the accompanying drawings.

Figure 4:
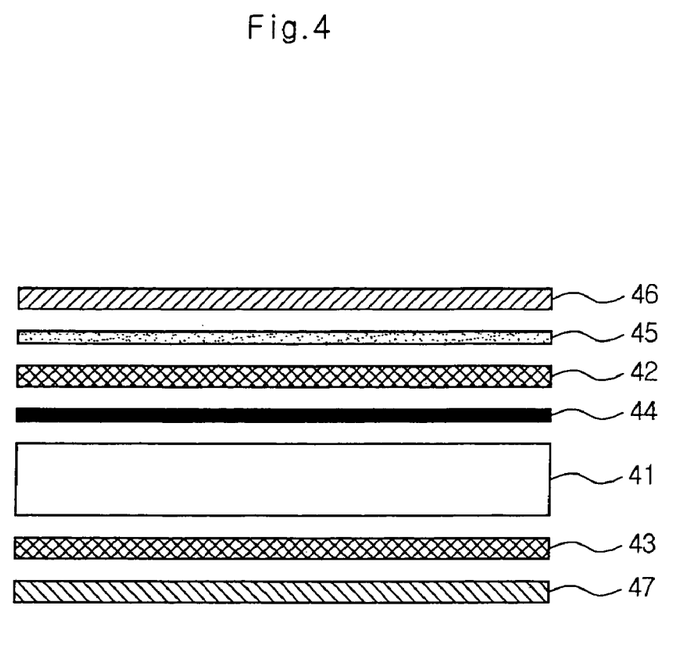
FIG. 4 shows a schematic view depicting the construction of a liquid crystal display using a compensating film according to a first embodiment of the invention.

FIG. 4 shows a schematic view of a construction of a liquid crystal display using a compensating film according to a first embodiment of the invention.

Referring to FIG. 4, a liquid crystal display includes a liquid crystal display (LCD) panel having an upper substrate 42 provided with a color filter formed thereon, a lower substrate 43 provided with a thin film transistor is formed thereon and spaced apart by a predetermined distance from the upper substrate 42. A liquid crystal layer 41 is interposed between the upper substrate 42 and the lower substrate 43, and a first compensating film 44 formed over an inner surface of at least one of the upper substrate 42 and the lower substrate 43. A second compensating film 45 attaches over an outer surface of at least one of the upper substrate 42 and the lower substrate 43 provided with the first compensating film 44. First and second polarizing plates 46 and 47 attach over an outer surface of another one of the upper substrate 42 or the lower substrate 43 such that an optical transmission axis of the first polarizing plate 46 is perpendicular to an optical transmission axis of the second polarizing plate 47.

On the lower substrate 43 of the LCD panel, a thin film transistor (TFT) functioning as a switching device is formed at a cross point of a gate line and a data line. Over the upper substrate 42, a black matrix (BM) layer, a color filter layer and a common electrode are formed.

The first compensating film 44 uses a C-plate of a uniaxial film or a biaxial film, or uses an A-plate of a uniaxial film or a biaxial film.

The second compensating film 45 uses a C-plate of a uniaxial film or a biaxial film, or uses an A-plate of a uniaxial film or a biaxial film.

The first and second compensating films 44 and 45 can be employed in a TN mode, a VA mode, an IPS mode or an OCB mode. According to the employed mode, the A-plate is designed to have a thickness of 10 nm to 400 nm, the C-plate is designed to have a thickness of 0 to 350 nm, and the O-plate is designed to have a thickness range of 0 to 200 nm.

When the refractive indexes in x, y and z directions of a Cartesian coordinate are $n_x$, $n_y$ and $n_z$ respectively, the uniaxial property or biaxial property of the first and second compensating films 44 and 45 is determined depending on whether the $n_x$ is identical to the $n_y$. In other words, when refractive indexes of two directions are identical to each other and their size is different than the size of the remaining direction, it is called 'uniaxial.' When the refractive indexes in the three directions are different from one another, it is called 'biaxial.'

The generally used compensating film formed from a uniaxial refractive index anisotropic material is disposed such that the long axis of the ellipsoid is parallel to or is perpendicular to a surface of the film.

Next, a method of manufacturing an LCD using the compensating film of FIG. 4 will be described. First, one prepares a liquid crystal display (LCD) panel having an upper substrate 42 provided with a color filter formed thereon, a lower substrate 43 provided with a thin film transistor formed thereon and spaced apart by a predetermined distance from the upper substrate 42. A liquid crystal layer 41 is interposed between the upper substrate 42 and the lower substrate 43. A first compensating film 44 is coated on an inner surface of at least one of the upper substrate 42 and the lower substrate 43.

FIGS. 5A through 5D show flow diagrams illustrating a method of manufacturing a compensating film in an LCD panel according to the invention.

Figure 5A:
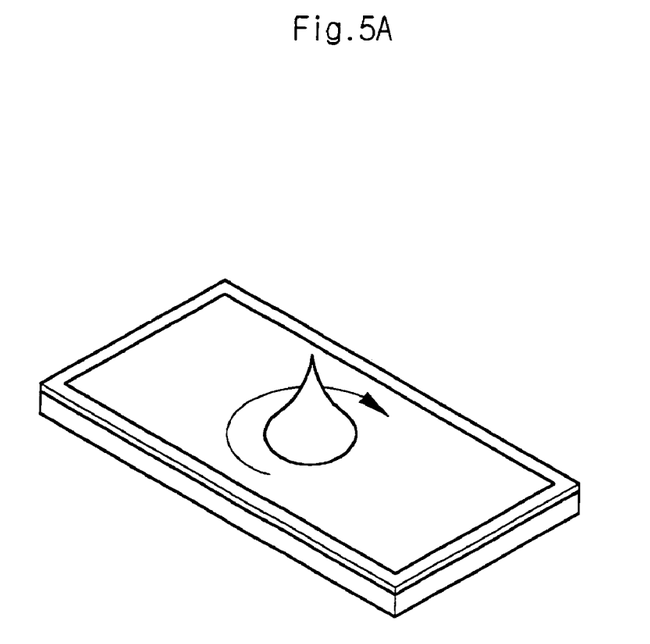
FIGS. 5A through 5D are flow diagrams illustrating a method of manufacturing a compensating film in an LCD panel according to the invention.

As shown in FIG. 5A, an organic polymer film called a 'photo-orientation film' is coated on the upper substrate 42 or the lower substrate 43 to align the liquid crystal molecules in a specific direction. The coated organic polymer film is heated and aligned at a temperature range of about 60-80° C. to vaporize a solvent, and is then hardened at a temperature range of about 80-200° C. The photo-orientation film is formed of a polyimide-based organic material. However, other suitable materials can be used.

Figure 5B:
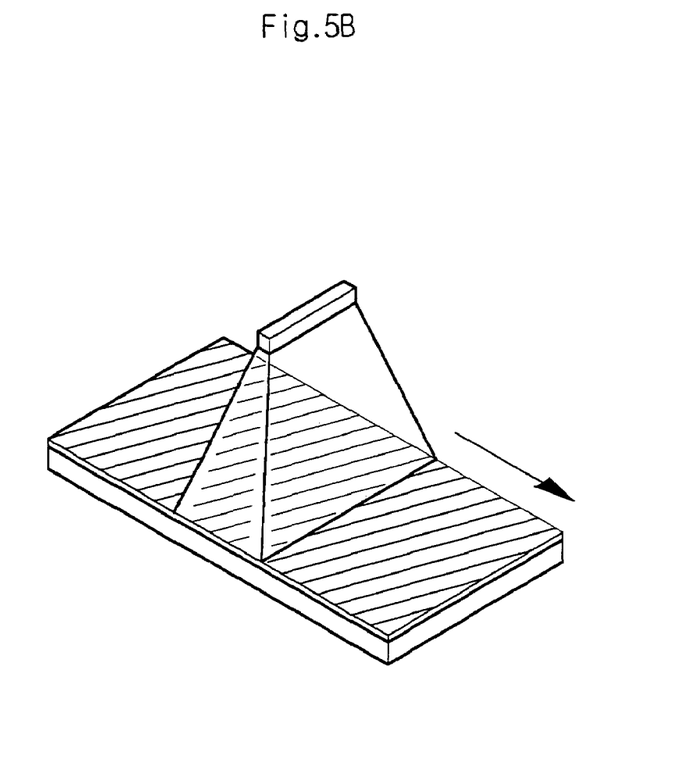

As shown in FIG. 5B, non-polarized ultraviolet rays or ion beams are irradiated onto the photo-orientation film to perform an orientation treatment. In particular, by arbitrarily controlling the orientation direction of the photo-orientation film, the resulting manufactured compensating film has an optical axis with a predetermined angle with respect to an advancing direction of a light. Alternatively, the photo-orientation film may be orientation-treated by a rubbing method.

Figure 5C:
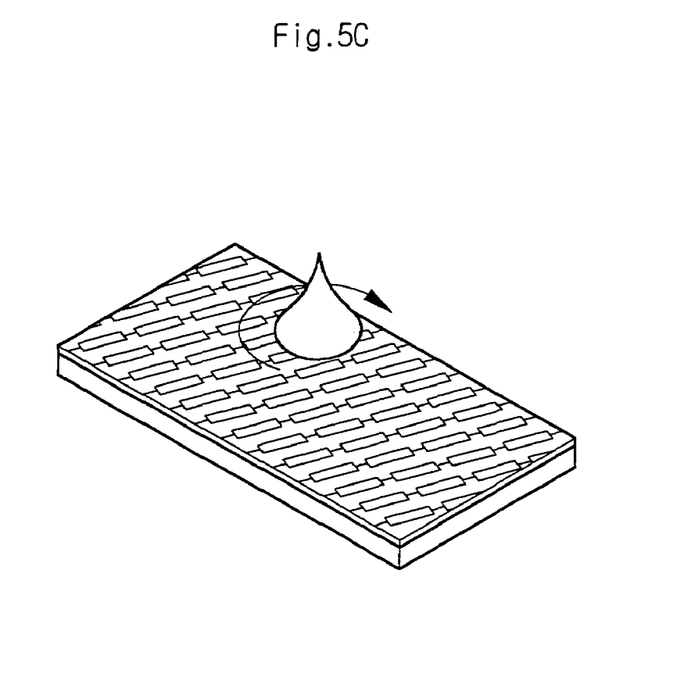

Next, as shown in FIG. 5C, a photo-hardenable liquid crystal of coatable retarder is coated on the orientation-treated photo-orientation film. The coatable retarder can be a solution having a concentration of 10 wt % or more, preferably, 15-30 wt % made by dissolving a hardenable nematic liquid crystal and a photo-initiator (IG184, Ciba-Geigy) 5 wt % into 3-penthanone, and then the coatable hardener is coated. Other solvents, such as MEK, can be used. The solvent is not restricted to a ketone, and any appropriate solvent can be used.

Figure 5D:
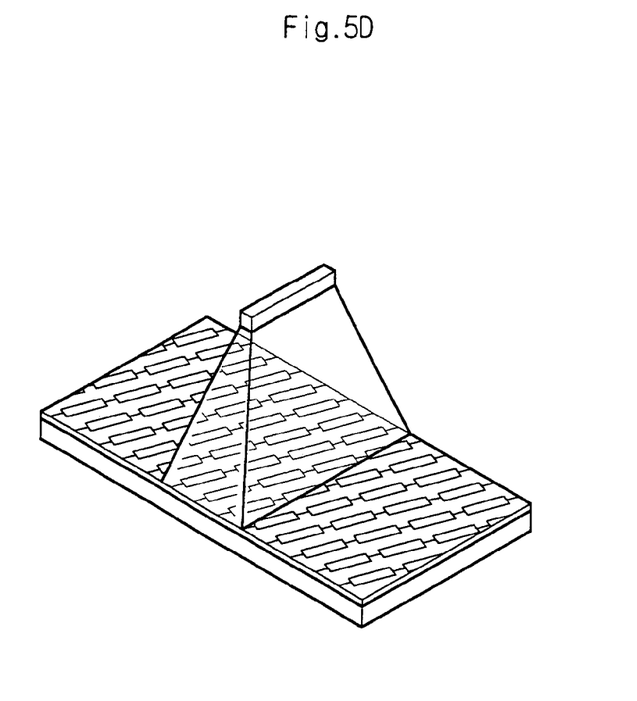

Next, as shown in FIG. 5D, the substrate coated with the photo-hardenable retarder is dried at a temperature of about 70° C. or more, preferably about 75-90° C., and then hardened and fixed to a film by irradiating non-polarized ultraviolet rays or ion beams.

After that, a second compensating film 45 is attached over an outer surface of at least one of the upper substrate 42 and the lower substrate 43 on which the first compensating film 44 is formed.

Thereafter, first and second polarizing plates 46 and 47 are attached over the second compensating film 45 and on an outer surface of the another one of the upper substrate 42 and the lower substrate 43, on which the second compensating film 45 is not attached, such that a first optical axis of the first polarizing plate 46 lies perpendicular to a second optical axis of the second polarizing plate 47.

Thus, a coating process forms the first compensating film 44 disposed inside the LCD.

Figure 6:
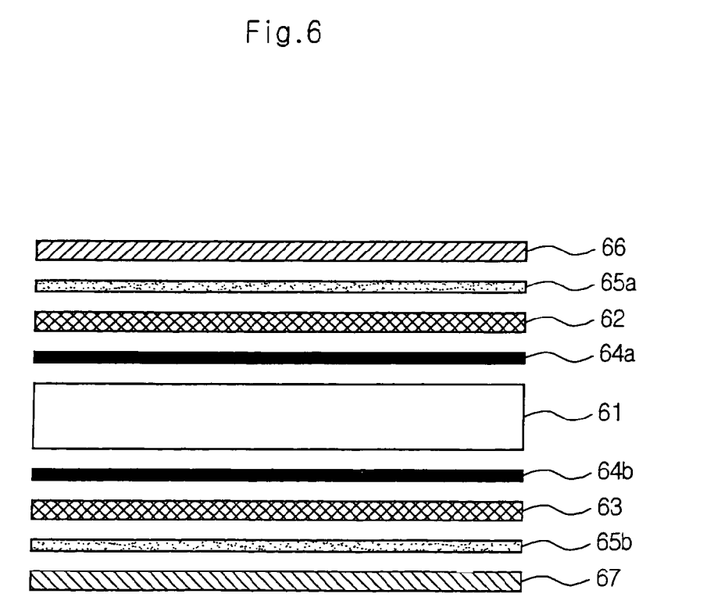
FIG. 6 shows a schematic vies of a construction of a liquid crystal display using a compensating film according to a second embodiment of the invention.

FIG. 6 shows a schematic view of the construction of a liquid crystal display using a compensating film according to a second embodiment of the invention.

Referring to FIG. 6, a liquid crystal display includes a liquid crystal display (LCD) panel having an upper substrate 62 provided with a color filter formed thereon, a lower substrate 63 provided with a thin film transistor formed thereon and spaced apart by a predetermined distance from the upper substrate 62. A liquid crystal layer 61 is interposed between the upper substrate 42 and the lower substrate 43, and first compensating films 64a and 64b are respectively formed over an inner surface of the upper substrate 62 and over an inner surface of the lower substrate 63. The second compensating films 65a and 65b respectively can attach on an outer surface of the upper substrate 62 and an outer surface of the lower substrate 63. The first and second polarizing plates 66 and 67 attach over the second compensating films 65a and 65b such that a first optical transmission axis of the first polarizing plate 66 is perpendicular to a second optical transmission axis of the second polarizing plate 67.

A further detailed description of the second embodiment will be omitted since the first embodiment provides such a description.

In the second embodiment of the invention, the first compensating films 64a and 64b are respectively formed over the inner surface of the upper substrate 62 and the inner surface of the lower substrate 63. The second compensating films 65a and 65b are respectively attached over the outer surface of the upper substrate 62 and the outer surface of the lower substrate 63.

Meanwhile, the first compensating films 64a and 64b respectively formed on the inner surfaces of the upper substrate 62 and the lower substrate 63 are also formed by the previously discussed inventive coating process.

The first compensating films 64a and 64b can use a C-plate of a uniaxial film or a biaxial film, or use an A-plate of a uniaxial film or a biaxial film. The second compensating films 65a and 65b can also use a C-plate of a uniaxial film or a biaxial film, or use an A-plate of a uniaxial film or a biaxial film.

When assuming that refractive indexes in x, y, z-direction of a Cartesian coordinate are $n_x$, $n_y$, and $n_z$, the uniaxial property and biaxial property of the first and second compensating films 64a, 64b, 65a, and 65b are determined depending on whether or not the $n_x$ is identical to the $n_y$.

Figure 7:
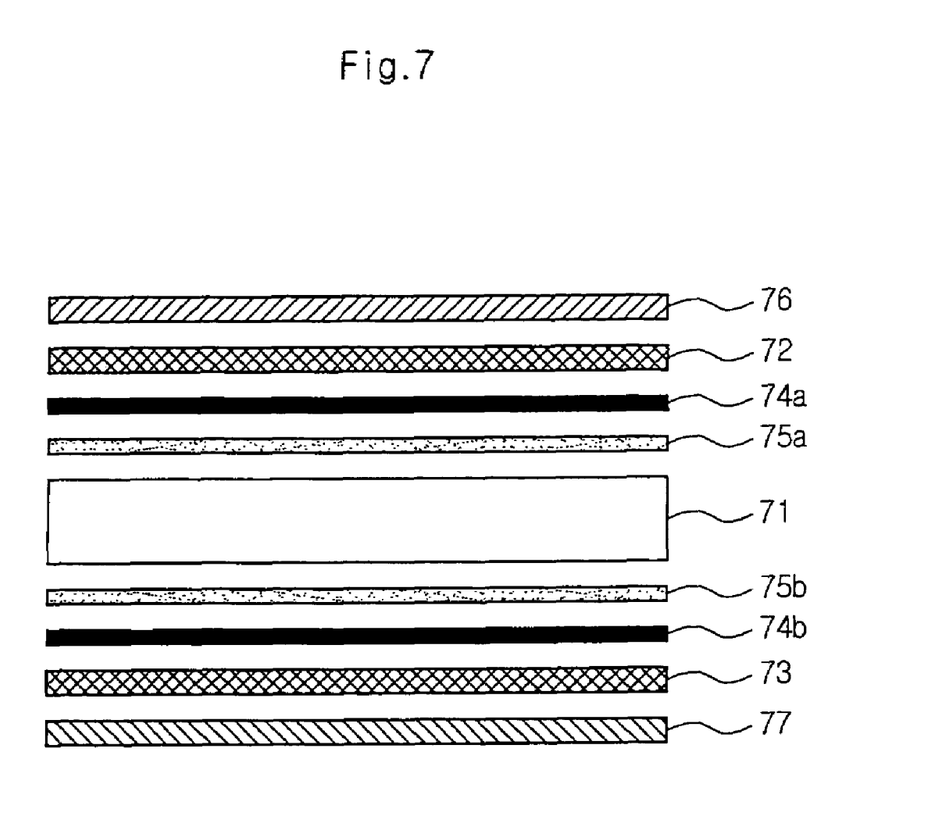
FIG. 7 shows a schematic view of a construction of a liquid crystal display using a compensating film according to a third embodiment of the invention.

FIG. 7 shows a schematic view of a construction of a liquid crystal display using a compensating film according to a third embodiment of the invention.

Referring to FIG. 7, a liquid crystal display according includes a liquid crystal panel having an upper substrate 72, a lower substrate 73 facing the upper substrate 72 and spaced apart by a predetermined distance from the upper substrate 72. A liquid crystal layer 71 is interposed between the upper substrate 72 and the lower substrate 73, and first compensating films 74a and 74b are respectively formed over an inner surface of the upper substrate 72 and an inner surface of the lower substrate 73. Second compensating films 75a and 75b are respectively formed on the first compensating films 74a and 74b, and first and second polarizing plates 76 and 77 are attached over outer surfaces of the liquid crystal panel such that a first optical transmission axis of the first polarizing plate 76 is perpendicular to a second optical transmission axis of the second polarizing plate 77.

A further detailed description of the third embodiment will be omitted since the first embodiment provides such a description.

In the third embodiment of the invention, the first compensating films 74a and 74b can be respectively formed over the inner surface of the upper substrate 72 and the inner surface of the lower substrate 73 by a coating process. The second compensating films 75a and 75b are respectively formed over the inner surface of the upper substrate 72 and the inner surface of the lower substrate 73 by a coating process. In other words, the second compensating films 75a and 75b are formed over the respective inner surfaces of the first compensating films 74a and 74b.

The first compensating films 74a and 74b can use a C-plate of a uniaxial or a biaxial film, or use an A-plate of a uniaxial or a biaxial film. The second compensating films 75a and 75b can also use a C-plate of a uniaxial or a biaxial film, or use an A-plate of a uniaxial or a biaxial film.

When assuming that refractive indexes in x, y, z-direction of a Cartesian coordinate are $n_x$, $n_y$, and $n_z$, the uniaxial property and biaxial property of the first and second compensating films 74a, 74b, 75a, and 75b are determined depending on whether or not the $n_x$ is identical to the $n_y$.

Figure 8:
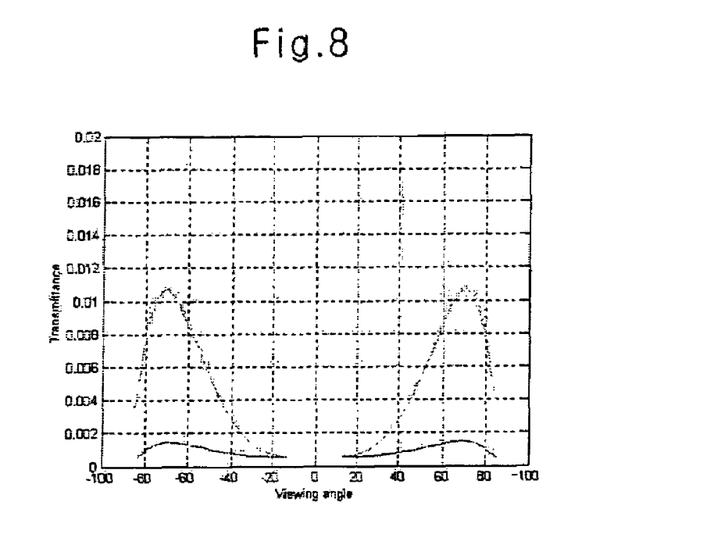
FIG. 8 shows a graph illustrating an improvement in light leakage at a viewing angle in an LCD using a compensating film according to the invention.

FIG. 8 shows a graph illustrating the improvement in light leakage at a viewing angle in an LCD using a compensating film according to the first to third embodiments of the invention. By using the coating-type compensating films according to the invention, the light leakage at a viewing angle of $\theta=\pm70°$ is greatly improved.

Also, the compensating films formed by the inventive coating process inside the LCD panel allows light leakage at a viewing angle to be prevented in a TN (Twisted Nematic) mode, a VA (Vertical Alignment) mode, an IPS (In-plane Switching) mode, an OCB (Optically Compensated Birefringence) mode and the like.

As has been shown, the inventive liquid crystal display and manufacturing method thereof produces compensating films that are formed inside the LCD panel, thereby preventing light leakage at a viewing angle due to the liquid crystal and the polarizing plate and also improving the color characteristics of the viewing angle.

It will be apparent to those skilled in the art that various modifications and variations can be made in the invention. Thus, it is intended that the invention covers the modifications and variations of this invention provided they come within the scope of the appended claims and their equivalents.

What is claimed is:

1. A liquid crystal display comprising:
    a liquid crystal panel having an upper substrate, a lower substrate facing the upper substrate and spaced apart at a predetermined distance from the upper substrate, and a liquid crystal layer interposed between the upper substrate and the lower substrate;
    a first compensating film of substantially uniform thickness formed over substantially the entirety of an inner surface of the upper substrate of said liquid crystal panel;
    a second compensating film formed over an outer surface of the upper substrate on which the first compensating film is formed; and
    first and second polarizing plates attached over the second compensating film and over an outer surface of the lower substrate such that a first optical transmission axis of the first polarizing plate is perpendicular to a second optical transmission axis of the second polarizing plate, wherein the first and second compensating films prevent light leakage with respect to viewing angle $\theta=\pm70°$.

2. The liquid crystal display of claim 1, wherein the first come sating film comprises a C-plate of a uniaxial film or a biaxial film, or comprises an A-plate of a uniaxial film or a biaxial film.

3. The liquid crystal display of claim 1, wherein the second compensating film comprises a C-plate of a uniaxial film, or a biaxial film, or comprises an A-plate of a uniaxial film or a biaxial film.

4. The liquid crystal display of claim 1 wherein the liquid crystal layer of the liquid crystal panel employs one mode selected from the group consisting of a TN mode, a VA mode, an IPS mode and an OCB mode.

5. A liquid crystal display comprising:
    a liquid crystal panel having an upper substrate, a lower substrate facing the upper substrate and spaced apart by a predetermined distance from the upper substrate, and a liquid crystal layer interposed between the upper substrate and the lower substrate;
    first compensating films respectively formed over an inner surface of the upper substrate and an inner surface of the lower substrate;
    second compensating films respectively attached over an outer surface of the upper substrate and an outer surface of the lower substrate; and
    first and second polarizing plates attached over the second compensating films such that a first optical transmission axis of the first polarizing plate is perpendicular to a second optical transmission axis of the second polarizing plate.

6. The liquid crystal display of claim 5, wherein the first compensating film uses a C-plate comprising a uniaxial film or a biaxial film, or uses an A-plate comprising a uniaxial film or a biaxial film.

7. The liquid crystal display of claim 5, wherein the second compensating film uses a C-plate comprising a uniaxial film or a biaxial film, or uses an A-plate comprising a uniaxial film or a biaxial film.

8. The liquid crystal display of claim 5, wherein the liquid crystal layer of the liquid crystal panel employs one mode selected from the group consisting of a TN mode, a VA mode, an IPS mode and an OCB mode.

9. The liquid crystal display of claim 5, wherein the first and second compensating films prevent light leakage with respect to a viewing angle $\theta=\pm70°$.

10. A liquid crystal display comprising:
    a liquid crystal panel having an upper substrate, a lower substrate facing the upper substrate and spaced apart by a predetermined distance from the upper substrate, and a liquid crystal layer interposed between the upper substrate and the lower substrate;
    first compensating films respectively formed over an inner surface of the upper substrate and an inner surface of the lower substrate;
    second compensating films respectively formed over the first compensating films; and
    first and second polarizing plates attached over outer surfaces of the liquid crystal panel such that a first optical transmission axis of the first polarizing plate is perpendicular to a second optical transmission axis of the second polarizing plate.

11. The liquid crystal display of claim 10, wherein the first compensating film uses a C-plate comprising a uniaxial flim or a biaxial flim or uses an A-plate comprising a uniaxial film or a biaxial film.

12. The liquid crystal display of claim 10, wherein the second compensating film uses a C-plate comprising a uniaxial film or a biaxial flim or uses an A-plate comprising a uniaxial film or a biaxial film.

13. The liquid crystal display of claim 10, wherein the liquid crystal layer of the liquid crystal panel employs one mode selected from the group consisting of a TN mode, a VA mode, an IPS mode and an OCB mode.

14. The liquid crystal display of claim 10, wherein the first and second compensating films prevent light leakage with respect to a viewing angle $\theta=\pm70°$.

15. A method of manufacturing a liquid crystal display provided with a liquid crystal panel having an upper substrate, a lower substrate facing the upper substrate and spaced apart by a predetermined distance from the upper substrate, and a liquid crystal layer interposed between the upper substrate and the lower substrate, the method comprising:
    forming a first compensating film of substantially uniform thickness over substantially the entirety of an inner surface of the upper substrate of said liquid crystal panel;
    attaching a second compensating film over an outer surface of the upper substrate over which the first compensating film is formed; and
    attaching first and second polarizing plates over the second compensating film and over an outer surface of the lower substrate such that a first optical transmission axis of the first polarizing plate is perpendicular to a second optical transmission axis of the second polarizing plate, wherein the first and second compensating films prevent light leakage with respect to a viewing angle $\theta=\pm70°$.

16. The method of claim 15, wherein the forming of the first compensating film comprises:
    printing a photo-orientation film over at least one of the upper substrate and the lower substrate and then hardening the printed photo-orientation film;
    performing an orientation treatment of the hardened photo-orientation film;
    coating a liquid crystal on the orientation-treated photo-orientation film; and
    immobilizing the orientation state of the coated liquid crystal.

17. The method of claim 16, wherein the orientation treatment of the hardened photo-orientation film is performed by one method selected from the group consisting of rubbing, using a non-polarized ultraviolet ray and using an ion beam.

18. The method of claim 16, wherein the adhering of the coated liquid crystal is performed by a non-polarized ultraviolet ray or an ion beam.

19. A liquid crystal display comprising:
    a liquid crystal panel having an upper substrate, a lower substrate facing the upper substrate and spaced apart at a predetermined distance from the upper substrate, and a liquid crystal layer interposed between the upper substrate and the lower substrate;
    a first compensating film formed over an inner surface of at least one of the upper substrate and the lower substrate;
    a second compensating film formed over an outer surface of at least one of the upper substrate and the lower substrate on which the first compensating film is formed; and
    first and second polarizing plates attached over the second compensating film and over an outer surface of the other one of the upper substrate and the lower substrate such that a first optical transmission axis of the first polarizing plate is perpendicular to a second optical transmission axis of the second polarizing plate, wherein the first and second compensating films prevent light leakage with respect to a viewing angle $\theta=\pm70°$, wherein the liquid crystal display has a transmittance of no greater than 0.01 to 0.012 with respect to the viewing angle $\theta=\pm70°$.

20. The liquid crystal display of claim 5, wherein the liquid crystal display has a transmittance of no greater than 0.01 to 0.012 with respect to a viewing angle $\theta=\pm70°$.

21. The liquid crystal display of claim 10 wherein the liquid crystal display has a transmittance of no greater than 0.01 to 0.012 with respect to a viewing angle $\theta=\pm70°$.

22. A method of manufacturing a liquid crystal display provided with a liquid crystal panel having an upper substrate, a lower substrate facing the upper substrate and spaced apart by a predetermined distance from the upper substrate, and a liquid crystal layer interposed between the upper substrate and the lower substrate, the method comprising:
    forming a first compensating film over an inner surface of at least one of the upper substrate and the lower substrate;

attaching a second compensating film over an outer surface of at least one of the upper substrate and the lower substrate over which the first compensating film is formed; and attaching first and second polarizing plates over the second compensating flint and over an outer surface of the other one of the upper substrate and the lower substrate such that a first optical transmission axis of the first polarizing plate is perpendicular to a second optical transmission axis of the second polarizing plate, wherein the first and second compensating films prevent light leakage with respect to a viewing angle $\theta=\pm70°$, wherein the liquid crystal display has a transmittance of no greater than 0.01 to 0.012 with respect to a viewing angle $\theta=\pm70°$.

* * * * *